C. GARDINER.
CAR FENDER.
APPLICATION FILED AUG. 22, 1908.
933,973.
Patented Sept. 14, 1909.
2 SHEETS—SHEET 1.
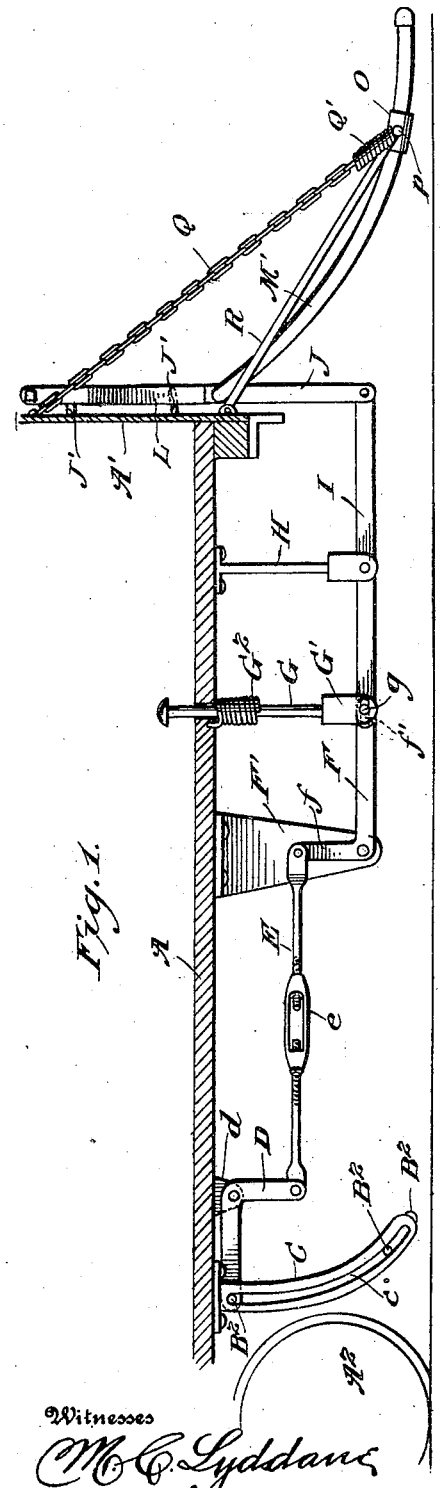
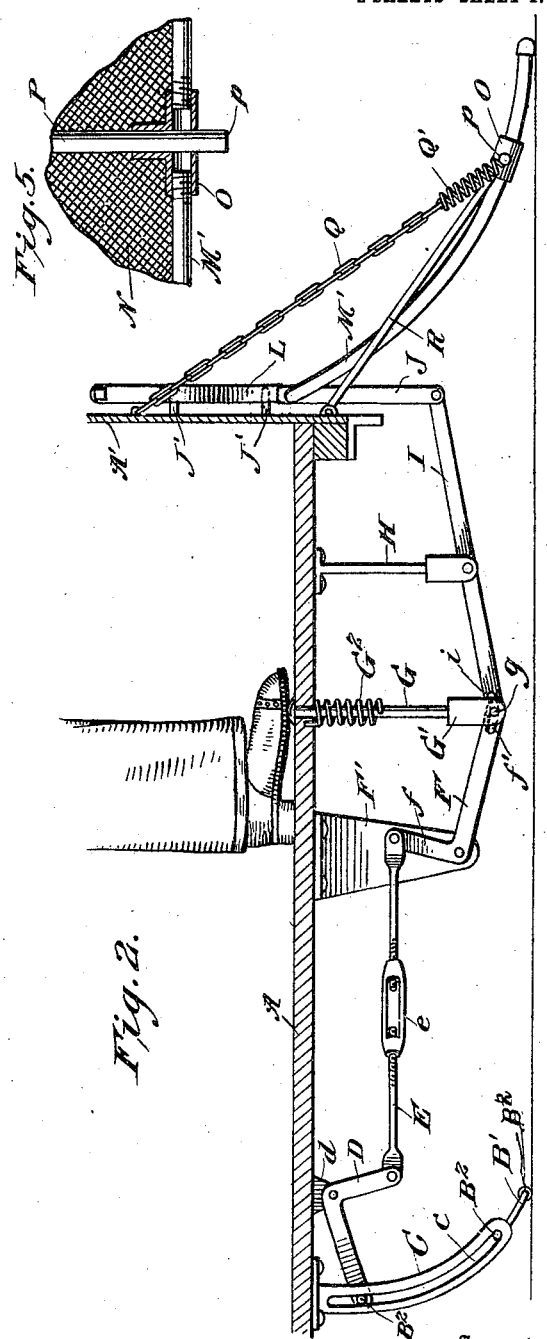
Inventor
Charles Gardiner

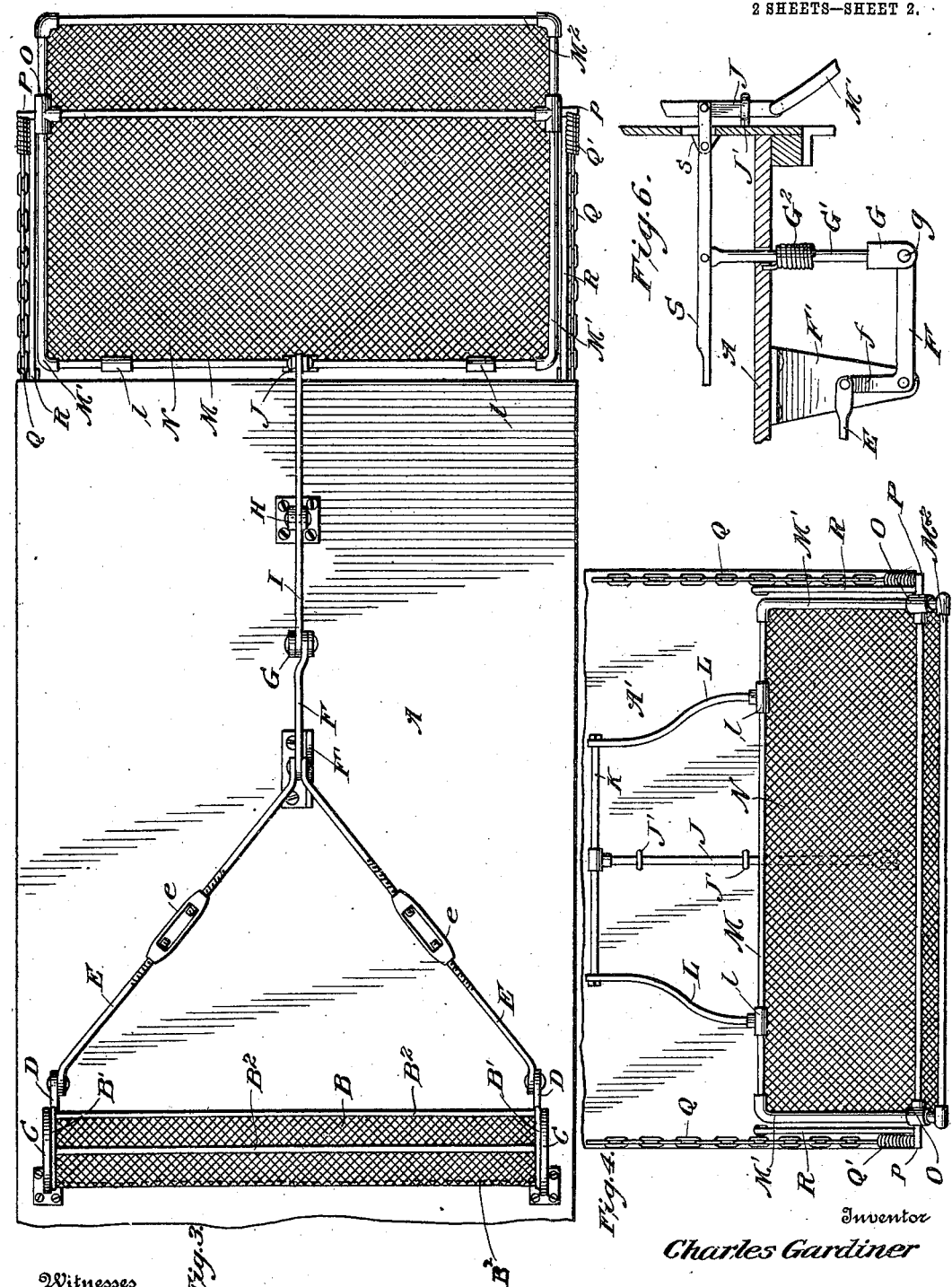

UNITED STATES PATENT OFFICE.

CHARLES GARDINER, OF PHILADELPHIA, PENNSYLVANIA, ASSIGNOR TO I. WALTER THOMPSON, OF PHILADELPHIA, PENNSYLVANIA.

CAR-FENDER.

933,973.  Specification of Letters Patent.  Patented Sept. 14, 1909.

Application filed August 22, 1908. Serial No. 449,760.

*To all whom it may concern:*

Be it known that I, CHARLES GARDINER, a subject of the King of Great Britain, residing at Philadelphia, in the county of Philadelphia and State of Pennsylvania, have invented certain new and useful Improvements in Car-Fenders, of which the following is a specification.

My invention relates to car fenders, and particularly to fenders for trolley cars, the object of the invention being to provide a wheel guard or fender located in front of the forward wheels as well as a fender on the front of the car.

A further object is to provide means whereby both fenders, which are normally somewhat raised from the tracks may be depressed by the motorman into contact with the rails whenever necessity arises.

To these ends my invention consists in providing a front fender and wheel fender and connecting them by a series of levers actuated by the motorman so that the fenders may be raised or depressed when the necessity arises.

In the drawings, Figure 1, is a longitudinal section of the front end of the car. Fig. 2, is a like view. Fig. 3, is an under side view of the forward end of the car platform. Fig. 4, is a front view thereof. Fig. 5, is a fragmentary detail of the fender. Fig. 6, is a detail section showing a modification.

A designates a car platform of any usual construction having the dash-board A' and the forward wheels A².

B designates a wheel fender which extends entirely across the car beneath the platform and forward of the front wheels. The body of the fender is made of any suitable material, as for instance, a net work of rope or wire. The fender B is provided at its ends with curved rods B', and the latter are connected by three cross rods B². The rear cross rod B² and the intermediate cross rod project into and are movable in slots $c$ in curved hangers or guides C. The hangers or guides C are securely bolted to the under side of the platform as shown, and effectually support the fender B. Connected to each end of the fender B in any desired manner are the bell-crank levers D which are pivotally mounted in the ears $d$ extending from the car bottom. Rods E having turn-buckles $e$ in their length connect the downward projecting ends of the bell-cranks D with the upwardly projecting end $f$ of the bell-crank F which is pivoted to a support F' extending downwardly from the car bottom. The bell-crank F is in turn actuated by a foot rod G which projects up through the floor of the car, in the construction shown in Fig. 1 in position convenient to the foot of the motorman. At its lower end the rod has a clevis G' with a transverse pin $g$ which passes through a slot $f'$ on the end of the bell-crank lever F. A spring G² is attached at one end to the rod G and at its other end to the bottom of the platform. This spring might however surround the rod above the platform and act as a compression spring instead of a retractile spring.

H designates a standard projecting downward from the bottom of the car on the lower end of which is pivoted the lever I. The rear end of this lever is slotted as at $i$, and through this slot passes the pin $g$. The forward end of the lever is pivoted to a vertically moving sliding rod J carried in guides J' on the dash-board of the car. A cross bar K is supported on the upper end of the rod J having at its ends the depending arms L which carry at their lower ends the sleeves $l$. Through these sleeves passes the upper cross bar M of the front fender. The front fender N has its body made of relatively yielding material such as a net work of rope or wire. This is attached to the cross bar M, to the opposed side bars M' and to the lower cross bar M². Preferably the side bars are tubular and each is made in two parts joined by a four-way coupling O, which is located about a quarter of the distance from the end of the fender. A transverse bar P is carried by the couplings and projects through the same to form studs $p$. Attached to the studs are chains Q which extend upward and to the dash-board. Preferably the lower ends of the chains are provided with springs Q' to which the studs are immediately attached. Pivoted brace rods R are also attached to the stud or to the frame of the fender and are pivoted to the front end of the car.

In order to avoid the necessity of having two sets of levers F and the difficulty of connecting these with the front rod G, the connecting rods E heretofore referred to are made to extend inward toward each other as shown in Fig. 3, and are pivoted to the one bell-crank lever F, which is located in the middle of the car.

The construction before described might in some cases be interfered with by the frame of the car, and to obviate this I use the construction shown in Fig. 6, in which the foot rod G is pivoted at its upper end to a treadle lever S which extends through the dash-board of the car and has its outer end pivoted to the slide rod J. The lever S is itself pivoted in a bearing s on the dash-board. It will be seen that when the inner end of the lever S is depressed, the bell-crank lever will be rocked and the slide bar J is raised.

The operation of the mechanism shown in Figs. 1, 2 and 3 is as follows: Upon a depression of the foot rod G the lever F will be rocked drawing on rods E and rocking bell-crank levers D, thus depressing the fender B to the position shown in Fig. 2. At the same time the lever I will be rocked and the slide rod J raised which will raise the upper end of the front fender, causing the fender to be swung in the arc of a circle with the upper pivot ends of the links R as pivot pins, against the action of the springs Q to throw the forward end of the fender down upon the pavement, as clearly shown in Fig. 2.

It will be seen by the construction described that I have provided a fender both in front of the car and in front of the forward wheels; and that normally these fenders are held up from the tracks and hence form no impediment to the movement of the car, while the fenders can be immediately depressed by the motorman when a necessity arises, thus preventing a person knocked down by the car from being rolled beneath the front fender and into contact with the wheels.

Having thus described my invention what I claim as new and desire to secure by Letters Patent is:

1. In a car, a bell-crank lever pivoted to the underside of the car forward of the front wheels, a wheel fender attached to the rear ends of said bell-crank levers, a foot rod projecting downward through the bottom of the car, a bell-crank lever attached thereto, connections between said last named bell-crank lever and said bell-crank levers attached to the fenders, a front fender pivotally supported at its forward end, and a lever connected at one end to said foot rod and at its other end to the rear of said front fender whereby when the foot rod is depressed the rear of the front fender will be lifted and the front end depressed.

2. In a car, a front fender, a vertically sliding rod to which the rear end of the front fender is connected, studs projecting from the fender, flexible connections between said studs and the dash-board of the car, a lever pivoted on its forward end to said vertically sliding rod, a foot rod to which the rear end of said lever is pivoted, a spring for returning said rod to its normal position, a bell-crank lever having one arm thereof pivoted to said rod, diverging rods connecting the other end of said bell-crank lever to a rear bell-crank lever, and a wheel fender connected to one of the arms of said rear bell-crank levers.

3. A car fender comprising a frame having side bars and webbing supported within said frame, studs projecting from said side bars, upwardly extending arms on said fender, a sliding bar connected to said arms, eyes through which said bars slide attached to the dash-board, fender-chains connecting the dash-board to said laterally projecting studs, and a lever connected to the said sliding bar and provided on its end with a foot rod whereby the lever may be operated.

4. In a car, a fender in front of the dash-board, a wheel fender located in front of the forward wheels, downwardly and forwardly extending guides attached to the under side of the car platform in which said wheel fender is supported and slides, and means whereby the front and rear fenders may be operated simultaneously to depress or lower them.

5. In a car, a wheel fender located just forward of the front wheels, downwardly and forwardly extending guide bars, studs projecting laterally from said fender and engaging with said guide bars, a bell-crank lever pivoted to the under side of the car forward of the front wheels and connected to said fender, a foot rod projecting downward through the bottom of the car, a bell-crank lever attached thereto, and connections between the said first and last named bell-crank levers whereby a depression of the foot rod will rock said bell-crank levers and depress said fender.

In testimony whereof I have signed my name to this specification in the presence of two subscribing witnesses.

CHARLES GARDINER.

Witnesses:
FREDERIC B. WRIGHT,
J. A. L. MULHALL.